INVENTOR.
JOHN L. LOWRANCE
BY
R.Y. Brodahl

Feb. 14, 1961 J. L. LOWRANCE 2,971,332
ELECTRICAL TIMING CONTROL APPARATUS
Filed Nov. 13, 1956 6 Sheets-Sheet 3

INVENTOR.
JOHN L. LOWRANCE
BY
R. J. Brodahl
ATTORNEY

INVENTOR.
JOHN L. LOWRANCE
BY R.Y. Brodahl
ATTORNEY

United States Patent Office 2,971,332
Patented Feb. 14, 1961

2,971,332
ELECTRICAL TIMING CONTROL APPARATUS
John L. Lowrance, South Bend, Ind., assignor to The Bendix Corporation, a corporation of Delaware
Filed Nov. 13, 1956, Ser. No. 621,577
11 Claims. (Cl. 60—39.14)

The present invention relates in general to electrical control apparatus and more particularly to electrical timer control apparatus for providing an accurate time delay or time control period for control purposes.

It is an object of the present invention to provide an improved timer apparatus for providing a more accurate and reliable timing operation.

It is another object of the present invention to provide an improved timer apparatus for providing a more desirable and accurate time delay period for control purposes.

It is a different object of the present invention to provide an improved timer control apparatus which is operative with one or more other timer controls for controlling the time and the time difference of predetermined operations.

It is an additional object of the present invention to provide an improved timer control apparatus for controlling the operation of an engine, for example a rocket engine or the like, which timer control apparatus may be responsive to one or more engine operating parameters or conditions for determining the operation of the timer control apparatus.

It is a further object of the present invention to provide an improved engine control apparatus for controlling and scheduling the supply of fuel to an engine and thereby the operation of that engine.

It is still another object of the present invention to provide an improved control apparatus for an engine operative with a plurality of fuels, for example liquid oxygen and kerosene or the like, which control apparatus is operative to schedule the supply of the said fuels to that engine.

These and other objects and advantages of the present invention will become apparent in view of the following description taken in conjunction with the drawings wherein.

Figure 1:
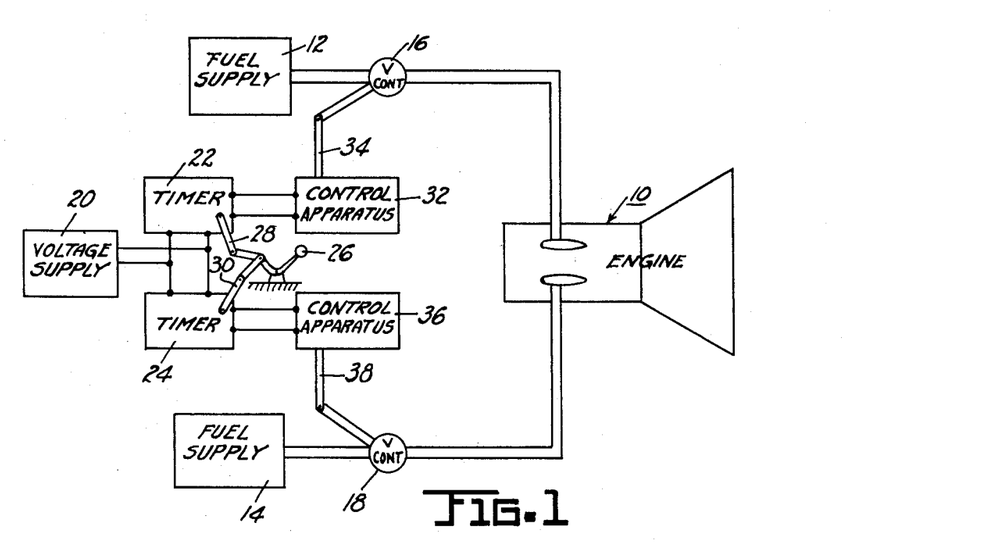
Figure 1 shows a diagrammatic view of control apparatus in accordance with the present invention.

Referring to the diagrammatic view of the control apparatus in accordance with the present invention as shown in Figure 1 there is shown an engine 10 or other device to be controlled and operative with a first fuel supply 12 and a second fuel supply 14. A first control valve or like member 16 is provided for controlling the supply of fuel from a fuel supply 12 to the engine 10 and a second control valve 18 is provided for controlling the supply of fuel from the second fuel supply 14 to the engine 10. An electrical power supply 20 is common to a first timer control apparatus 22 and a second timer control apparatus 24. The first timer control apparatus 22 is responsive to the position of a manual control throttle member 26 through a linkage arm 28, and the second timer control apparatus 24 is responsive to the position of the manual control throttle lever 26 through a second linkage arm 30. The output of the first timer control device 22 is applied through a control apparatus 32 having a movable output arm 34 for controlling the operation of the first control valve 16, and the second timer control apparatus 24 is connected to a second control apparatus 36 having a movable output arm 38 for controlling the operation of the second control valve 18.

Figure 2:
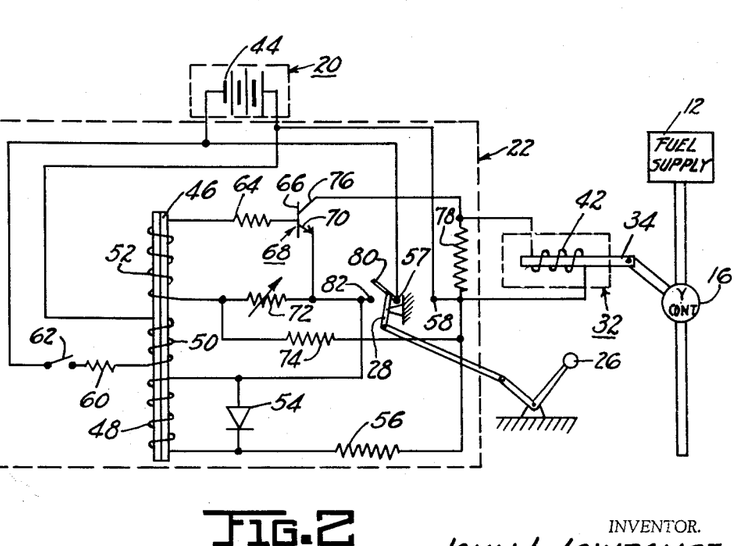
Figure 2 shows an electrical schematic of control apparatus in accordance with the present invention.

Referring to the timer control apparatus as illustrated in Figure 2 there is shown the first control valve 16 and the control apparatus 32 including the output control arm 34. A relay winding 42 is provided for controlling the position of the control arm 34. The timer apparatus 22 is operative with a power supply 20 which may be illustrated as a battery 44. The timer apparatus 22 includes a magnetic saturable core member 46 provided with a first control winding 48, a second winding 50 and a third winding 52. The first control winding 48 is connected in parallel with a unidirectional conductive or diode member 54 and through an impedance member 56 across the voltage source battery 44 as connected between the terminals 57 and 58. The second control winding 50 is connected through an impedance member 60 and a control switch 62 across the battery 44. The third control winding 52 is connected at one end through an impedance member 64 to the base 66 of a transistor 68 and the emitter 70 of the transistor is connected through a variable impedance member 72 back to the other end of the control winding 52. An impedance member 74 is connected between the latter end of the control winding 52 and the terminal 58 as shown. The collector 76 of the transistor 68 is connected through a load impedance 78 to the terminal 58, and the relay winding 42 is connected across this latter load impedance 78. The manual control throttle member 26 is shown connected through the control arm 28 to control the position of a switch member 80 connected between the terminal 57 and a third terminal 82.

It should be noted that the transistor member 68 is illustrated as an NPN type, however the involved control principle is equally applicable to the PNP type of transistor member if desired.

Figures 3, 6, 7, 8, 13:
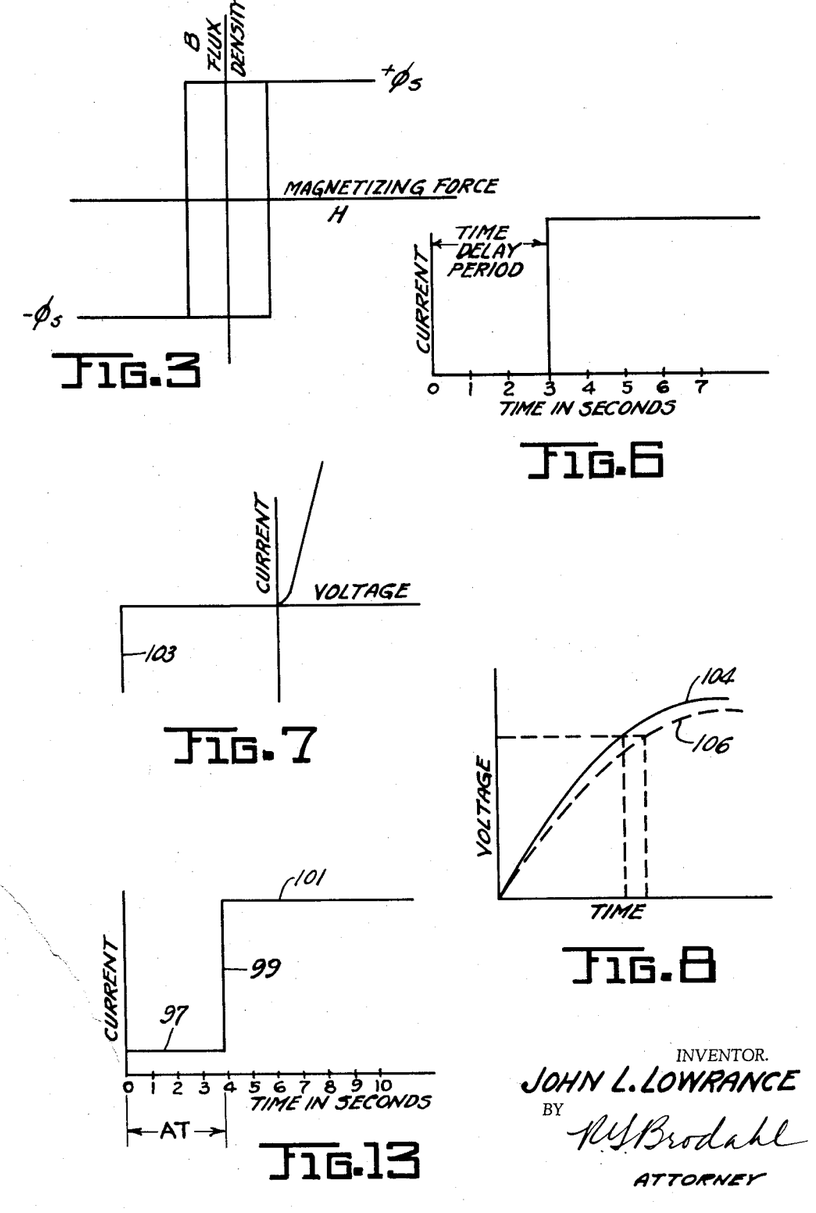
Figure 3 shows a curve chart illustrating the hysteresis loop of suitable saturable core material for use in accordance with the present invention.
Figure 6 is a curve chart illustrating the operation of the control apparatus in accordance with the present invention.
Figure 7 is a curve chart illustrating the operation of a portion of the timer control in accordance with the present invention.
Figure 8 is a curve chart illustrating the operation of prior art control apparatus.
Figure 13 is a curve chart illustrating the operation of the control apparatus shown in Figure 11.

In Figure 3 there is shown the idealized saturation characteristic curve for a magnetic material for use as the core 46 shown in Figure 2. Suitable material is available commercially at the present time under the typical trade names Orthanol or Deltamax. As shown in Figure 3 this material has very discreet saturation limits of its flux density, Bs, or flux per unit cross sectional area of the core.

Figure 4:
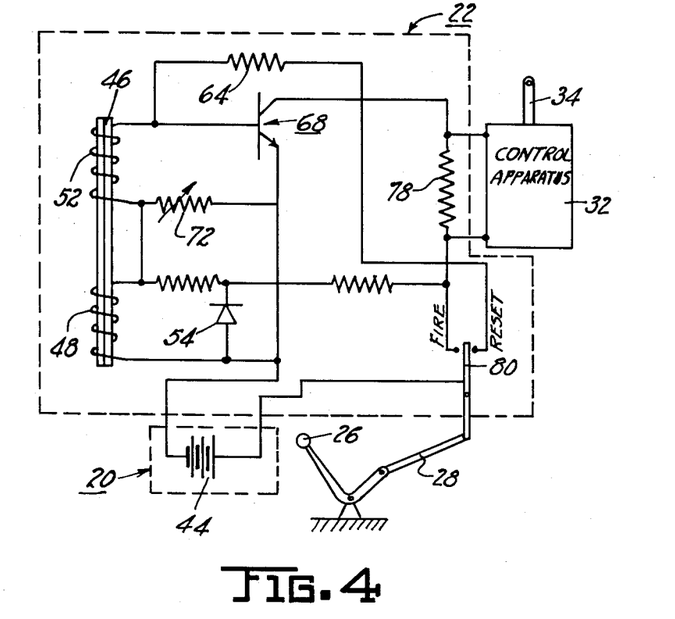
Figure 4 shows a schematic of a modified form of the control apparatus in accordance with the present invention.

The modification of the timer control apparatus as shown in Figure 4 utilizes a series connection of the two control windings 48 and 52 for the reset or magnetic saturation of the core member 46 in the negative direction, and therefore does not require the additional control winding 50 as shown in Figure 2.

Figure 5:
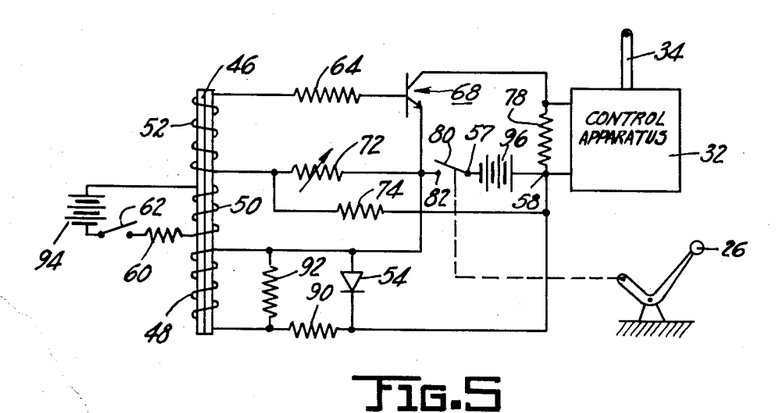
Figure 5 shows an electrical schematic of a still further modified form of control apparatus in accordance with the present invention.

In Figure 5 the control apparatus utilizes an impedance member 90 which has a positive temperature coefficient such that the impedance of the impedance member 90 varies as a function of the temperature to compensate for the change in flux density of the core member 46 with temperature. The impedance member 92 connected in parallel with the control winding 48 has a zero temperature coefficient. It should be noted that in Figure 5, merely for the purpose of convenience of illustration or if desired for the actual operation of the control apparatus, separate voltage sources 94 and 96 have been shown. The remainder of the control apparatus is similar to that shown in Figure 2.

In Figure 6 there is shown a curve plot of the transistor base current plotted as a function of time to illustrate the operation of the control apparatus as shown in Figures 2, 4 and 5.

The curve chart shown in Figure 7 illustrates the operation of the voltage regulating diode member 54 operating in the Zener portion of its current voltage characteristic for the purpose of providing a substantially constant reference voltage to the first control winding 48. In this respect the reverse current flow is substantially zero until a negative voltage as illustrated by the curve portion 103 is reached at which the diode effectively breaks down and this breakdown voltage is available as a substantially constant regulated voltage for control purposes if desired.

Figure 8 is a curve chart illustrating the operation of prior art resistance-capacitor time control circuits, and is provided to illustrate the effect of temperature changes upon the voltage time characteristic of such resistance-capacitor time circuits. The curve 104 may correspond to a first temperature and the curve 106 may correspond to a second temperature such that the difference in the time interval provided for the same control voltage at these respective temperatures is readily apparent.

Figure 9:
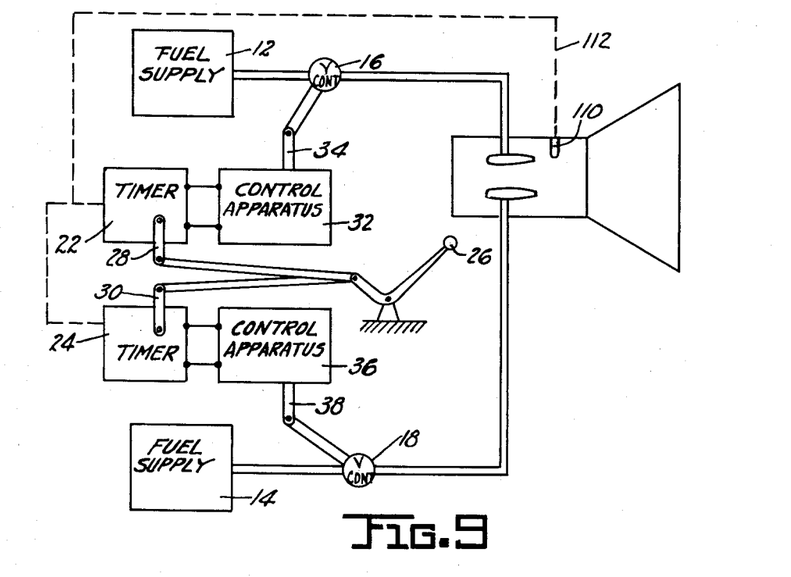
Figure 9 is a diagrammatic view of a modification of the control apparatus in accordance with the present invention.

In Figure 9 there is shown a diagrammatic view of a still further modification of the invention wherein an engine operating condition or parameter responsive member 110 is operatively connected through a connection 112 to the timer devices 22 and 24 for controlling the operation of said timer devices 22 and 24.

Figure 10:
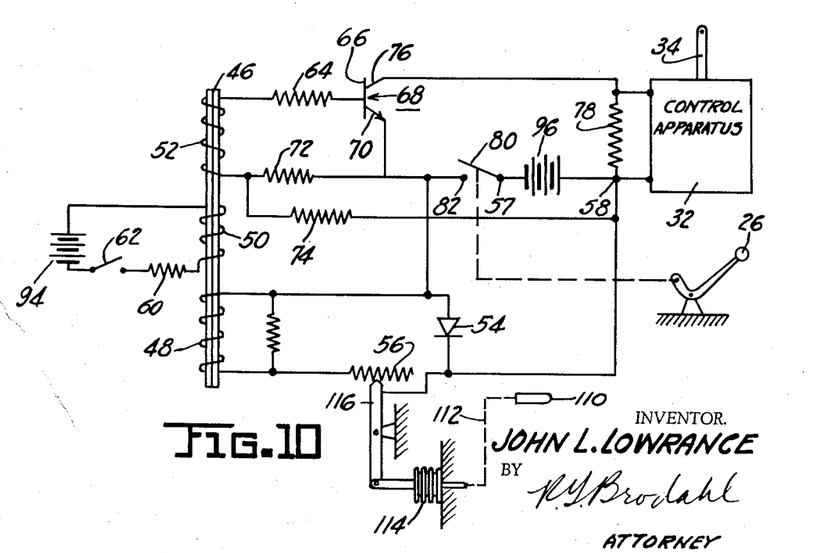
Figure 10 is an electrical schematic of a still different modification of the control apparatus in accordance with the present invention.

In Figure 10 there is shown an electrical schematic for one of the timer devices shown in Figure 9 with the engine operating parameter responsive device 110, which may be responsive for example to an engine operating temperature or an engine operating pressure, being operative through the connection 112 to a flexible bellows member 114 which may be responsive to the engine operating pressure or to the fluid displaced by the sensed engine operating temperature. The output of the bellows member 114 may be applied through a control arm 116 to vary the impedance of the member 56 connected in the circuit of the first control winding 48 as shown in Figure 10. This in turn raises the voltage impressed across the control winding and therefore the time period. The remainder of the control apparatus shown in Figure 10 may be similar to that shown in Figure 2, with separate voltage sources 94 and 96 provided.

Figure 11:
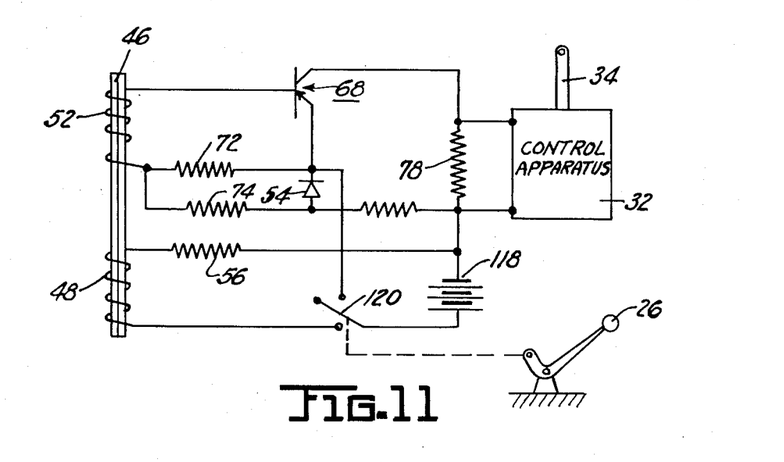
Figure 11 is an additional modification of the control apparatus in accordance with the present invention.

In Figure 11 there is shown a still additional modification of the control apparatus in accordance with the present invention wherein a single voltage source, which may be illustrated by the battery member 118, and a two-way operative switch member 120 are provided such that when the switch 120 is in the reset position, the first control winding 48 is operative to magnetically saturate the core member 46 in the negative direction. When the switch member is placed in the fire position the magnetization current for the core member 46, as illustrated by the curve chart of Figure 6, is operative with the control winding 52 and flows through the base circuit of the transistor member 68.

Figure 12:
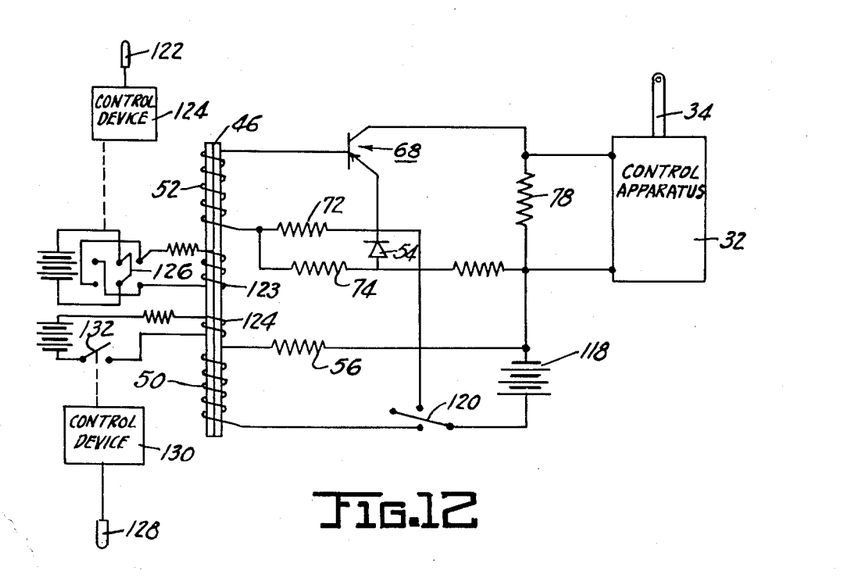
Figure 12 is a still additional modification of the control apparatus in accordance with the present invention.

In the apparatus shown in Figure 12 there is provided a first engine operative parameter responsive member 122 operative through a suitable control device 124 which may be for example, if the member 122 is responsive to an operating temperature, an electronic amplifier including a reference temperature in accordance with the teachings of copending application Serial No. 560,670, filed January 23, 1956, by N. K. Peters and D. A. Reynick and assigned to the same assignee as the present invention, such that as the engine operating temperature as sensed by the member 122 is above the reference temperature the control switch 126 is closed in a first direction to energize the control winding 123 with a first polarity and if the temperature as sensed by the member 122 is below the reference temperature the control switch 126 is moved in a second direction to energize the control winding 123 with a second and opposite polarity. A second parameter responsive device or member 128 is connected through a suitable control device 130 to control the position of a switch member 132 for energizing the control winding 124 as shown in Figure 12.

In Figure 13 there is shown a curve chart of the transistor base current plotted as a function of time in seconds. The first portion 97 of the curve corresponds to the magnetizing current for the magnetic saturation of the core member 46, the second portion 99 of the curve indicates the end of the provided time delay period, and the third portion 101 of the curve corresponds to the current available in the load impedance member 78 as shown in the Figure 11.

In the operation of the control apparatus in accordance with the present invention the magnetic core members are operative such that a change in the magnetic flux level can be related to the volt-time integral of the voltage induced in the windings of the reactor in accordance with the following formula wherein:

$$T = \frac{2B_m A N 10^{-8}}{E}$$

where T is the time in seconds, E is the voltage in volts, N is the number of turns in the saturating winding, A is the area in square centimeters of the core member, and $B_m$ is the gauss or flux density. A discreet time delay can be provided by the control apparatus in accordance with the present invention in that, for example, with the core member 46 as shown in Figure 2 magnetically saturated in a negative direction by the control winding 50, when the control voltage is applied to the control winding 48 by closing the switch member 80 the core member 46 is provided with magnetic flux to saturate it in a positive direction due to the basic transformer operational principle of a core member including a plurality of windings. The change in the magnetic flux linking the circuit due to the control winding 48 induces an electromotive force of value directly proportional to the time rate of change of flux linkage set up in the core member 46 by the control winding 52 in such a direction as to oppose said change in flux. Therefore a transformed voltage appears across the control winding 52 and is made to be greater in value than the biased voltage appearing across the impedance member 72 and of opposite polarity. When the core member 46 becomes saturated in the positive direction the transformer operation is no longer present and the induced voltage across the control winding 52 becomes zero. This allows the bias voltage across the impedance member 72 to cause current to flow in the base to emitter circuit of the transistor 68 such that a voltage will appear across the load impedance 78 for controlling the operation of the valve member 16 by suitable positioning of the output control arm 34. Therefore from the time $T_0$ that the voltage was applied to the control winding 48 by closing the switch member 80 until an output voltage appeared across the load impedance 78 a discreet time interval was provided, which was a function of the voltage applied to the control winding 48, the number of turns in the control winding 48, the gauss or flux denstiy of the core member 46, and the area of the core member 46. By making these values constant the discreet time delay or interval is similarly made constant, or if desired the time delay or interval can be made a function of some variable by making any one of the above parameters a function of that variable.

At the end of the desired control operation the switch member 80 may be opened and the switch member 62 may be closed, such that the core member 46 is again magnetically saturated in a negative direction. This places it at the opposite end of its hysteresis loop as shown in Figure 3. This insures that the flux change will correspond to twice $B_m$.

Figure 14:
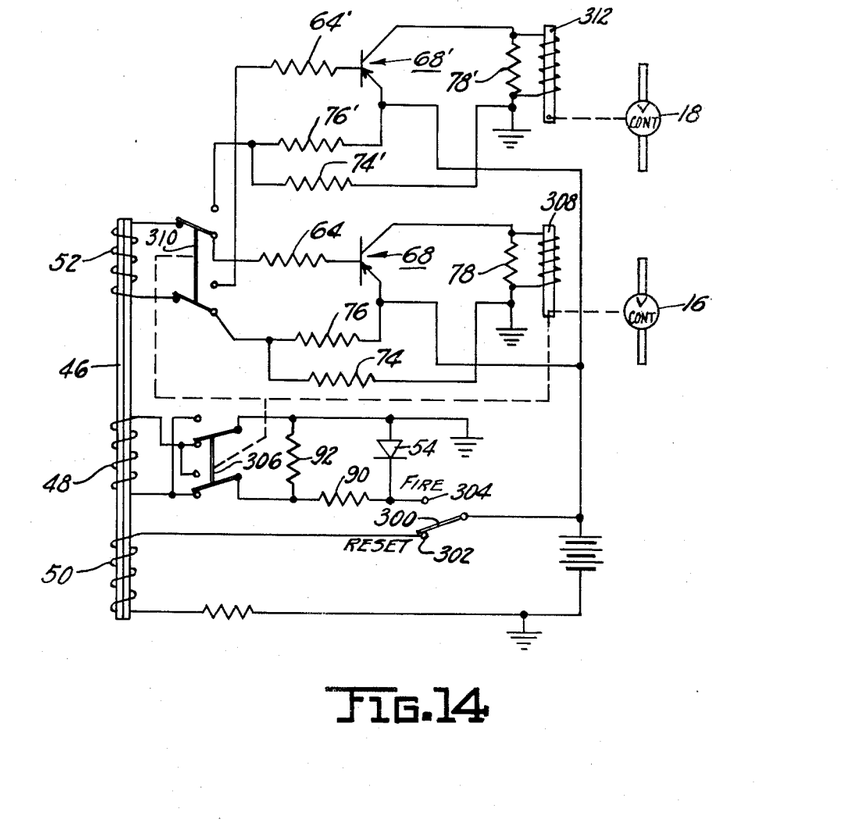
Figure 14 is a view of a still further modification of the present invention.

In the event that more than one time delay interval is desired the saturable reactor can be switched from one circuit to another thereby acting as the time reference in each case. This would tend to minimize the size of the control device. The control apparatus as shown in Figure 14 is illustrative of one form of such a control device.

In the control apparatus as shown in Figure 4, it is preferable that the control winding 52 be provided with a greater number of turns than is the control winding 48.

If desired the switch member 62 may be initially closed to magnetically saturate the core member 46 in a negative direction and subsequently the switch member 80 may be closed without opening the switch member 62, provided that the control winding 48 has a greater number of turns than the control winding 50 such that the volt turn product of the control winding 48 is greater than the volt turn product of the control winding 50 to cause flux to be induced in the core member 46 resulting in positive magnetic saturation of the core member 46.

A voltage will then be induced in the control winding 52 as a result of this flux change which voltage is of the polarity as shown in Figure 2 and opposes the voltage drop across the impedance member 72. If the voltage drop across the latter impedance member 72 is less than the voltage induced in the winding 52 no current will flow in the base circuit of the transistor 68 since the base 66 must be of positive polarity relative to the emitter 70 for current to flow in the collector circuit of the transistor 68. After a predetermined time interval $T_1$ the core member 46 has become saturated in a positive direction such that no additional flux change can occur in this direction once the core is saturated. Therefore the valtage induced in the control winding 52 will disappear and the base of the transistor will become positive with respect to the emitter such that current will then flow in the base circuit and a correspondingly larger current will flow in the collecter circuit of the transistor member 68. Thus at a controlled time interval after the control switch 80 was closed a voltage will appear across the load impedance member 78. The transistor member 68 thus functions as a switching device and is therefore turned full on by the bias or voltage drop across the impedance member 72 and applied to the base 66. The impedance 56 is utilized to step down the voltage as applied to the control winding 48 to a level where the diode 54 may be used as a voltage regulating Zener reference diode.

During the time interval that the core member 46 is being driven from negative to positive magnetic saturation, the effective impedance in parallel with the diode 54 is relatively high due to the inductive characteristics of the core member 46. The voltage appearing across control winding 48 is then equal to the Zener voltage of the diode 54 except for the IR drop of the magnetizing current and the winding resistance of the control winding 48. The impedance members 72 and 74 are provided to supply the bias voltage to the base 66 of the transistor member 68 as previously described. The impedance member 64 is used as a current limiting member in the base circuit. The impedance member 60 is used as a current limiting member in the reset circuit.

Since the saturating flux of the core member 46 is a function of temperature it may be desirable in some applications that this be compensated for by making the voltage across the control winding 48 vary in a compensating sense. This can be done with the control circuit embodiment as shown in Figure 5 wherein the impedance member 90 has a positive temperature coefficient and the impedance member 92 has a zero temperature coefficient such that the saturating flux of the core member 46 is compensated for by the impedance change of the impedance member 90 as a function of temperature.

Operating the transistor member 68 as a switching device makes it essentially insensitive to temperature changes as far as the control apparatus in accordance with the present invention is concerned and the timing period or interval will not be materially affected in this regard. However a certain amount of attenuation of the output circuit may result from the change with temperature in the value of the saturated resistance of the collector-emitter junction of the transistor.

In the operation of the control apparatus embodiment as shown in Figure 11, and referring to the saturation characteristic for a magnetic material as shown in Figure 3, it is seen that very discreet saturation limits of flux density or flux per unit cross sectional area of core member 46 may be obtained. Thus it is seen that a fixed volt time product is required to change the flux level of the core member 46 from negative to positive saturation. Therefore by holding the number of turns and the applied voltage constant a definite time is required to change the flux from negative to positive saturation, and this characteristic may be utilized to provide a time delay in the operation of the transistor member 68. By placing the switch member 120 in the reset position the control winding 48 is utilized to negatively saturate the core member 46. Then at time $T_0$ the control switch 120 is moved to the fire position which applies a voltage across the control winding 52 and removes the reset voltage from the control winding 48 to result in the core member 46 being driven in a magnetically saturating positive direction from the initial negative saturation. The current that flows in the base circuit of the transistor member 68 for magnetizing the core member 46 in a positive direction can be termed the magnetization current of the core member 46. This current is proportional to the width of the hysteresis loop of the magnetic core as illustrated in Figure 3. When the core member 46 saturates in the positive position the current that flows in the base circuit is a function of the resistance in the base circuit, the winding resistance of the saturable reactor and the emitter to base resistance of the transistor. The ratio of base current prior to and following saturation can be made quite large, and is illustrated by the curve shown in Figure 6. This results in the transistor member at the end of the desired time delay period being switched on to provide a load current through the impedance member 78 which results in a voltage drop across the impedance member 78 which may be utilized for controlling the control apparatus 32 as shown in Figure 11.

In the operation of the apparatus as shown in Figure 12 the net magnetic flux change within the core member 46 is a function of the volt-time integral applied to the core member 46 in accordance with the formula $$\int_{t_1}^{t_2} e\,dt = N[\phi_2 - \phi_1]$$

The time period may be made a function of one or more variables such as for example the operating parameters of an engine if desired. In this respect the parameter responsive member 122 may be responsive to an engine operating temperature for example and the parameter member 128 may be responsive to an engine operating pressure for example such that the time period may be lengthened or shortened in response to the variation in the respective engine operating temperature as sensed by the member 122 and the engine operating pressure as sensed by the member 128 such that the core member 46 may for example magnetically be saturated in a positive direction by the control winding 123 and may be magnetically saturated in a negative direction by the control winding 124 and when the core member 46 is eventually saturated in say the positive direction the transistor member 68 will be operative as a switching device to provide a current through the load impedance 78 for ending or determining the control time period. In this respect and referring to the diagrammatic illustration of Figure 1, the scheduling of fuel for example from the fuel supply 12 and the fuel supply 14 may depend upon the temperature and or pressure operating conditions of the engine 10 such that a first timer device 22 may be operative to control the supply of fuel from the first fuel supply 12 only after a first engine operating parameter has reached a desirable level after time zero which may for example correspond to a time of three seconds after an initial starting time, and then the second timer device 24 may be operative after a second parameter has reached a desirable level or even the first said parameter has reached a desirable level to schedule the fuel from the second fuel supply 14 to the engine 10, which may for example be in the order of after five seconds. In this respect a very flexible, accurate and reliable control apparatus has been provided.

In the operation of the apparatus as shown in Figure 14, the switch member 300 is initially moved from the reset contact 302 to the fire contact 304 to begin the timing period or periods. With the switch member 306 in its present position the polarity of winding 48 will be as illustrated. This will saturate the core member 46 in one direction, for example in a positive direction, and when the core member 46 is positively saturated the transistor 68 will become conductive as previously described. This energizes the relay control device 308 to open fuel valve 16 and to change the positions of the switch member 306 and the switch member 310. The latter change in the position of switch member 306 causes the polarity across winding 48 to reverse and to saturate the core member 46 in the opposite direction, for example in the negative direction. When the core member 46 becomes so saturated, the transistor 68' will become conductive in the manner previously described and energize the relay control device 312 to open the fuel valve 18, if desired. In this way the fuel valve 16 is first opened at some predetermined time period, and then the fuel valve 18 is subsequently opened at a later predetermined time period.

Although the present invention has been described with a certain degree of particularity it should be understood that the present disclosure has been made only by way of example and that numerous changes in the details of construction and the combination and arrangement of parts may be resorted to without departing from the scope and the spirit of the present invention.

I claim:

1. In an electrical timer device operative with a regulated direct current voltage source, the combination of a magnetically saturable core member, a first winding connected to said voltage source and operative with said core for magnetically saturating said core member in a positive direction, a second winding operative with said core member for providing an induced voltage across said second winding during the positive saturation of said core member by said first winding, a resistance member connected to said voltage source for providing a control voltage drop across said resistance member, and an electrical switching member responsive to said induced voltage and said voltage drop, with said control voltage drop normally maintaining said switching member in a conductive condition and being substantially counterbalanced by said induced voltage during the positive saturation of said core member.

2. In an electrical timer apparatus operative with a voltage source, the combination of a magnetically saturable core member having an initial saturation in a first direction, a first winding connected to said voltage source and operative with said core member for magnetically saturating said core member in a second direction opposite to said first direction, a second winding operative with said core member for providing an induced voltage across said second winding, an impedance member connected to said voltage source for providing a voltage drop across said impedance member, a transistor amplifier device connected to said impedance member and maintained in a normally conducting condition by said voltage drop, said impedance member being operative with said second winding such that said voltage drop is counterbalanced by said induced voltage during the magnetic saturation of the core member by said first winding.

3. In an electrical timer apparatus for controlling a movable member, said apparatus being operative with a regulated direct current voltage source, the combination of a magnetically saturable core member, a first control winding connected to said voltage source and operative with said core member for magnetically saturating said core member to positive saturation during a predetermined time interval established as a function of said direct current voltage, a second winding operative with said core member for providing an induced voltage across said second winding during the time period required for the positive saturation of said core member, an impedance member connected to said voltage source for providing a predetermined voltage drop across said impedance member, with said impedance member being operative with said second winding such that said voltage drop is counterbalanced by said induced voltage during said time period as determined by the positive saturation of said core, and an electrical control member operative with said impedance member for controlling said movable member.

4. In an electrical timer device for controlling the operation of an apparatus, said device being operative with a regulated direct current voltage source, the combination of a magnetically saturable core member, a first control winding connected to said voltage source and operative with said core member for magnetizing said core member to negative saturation, a second control winding selectively connected to said control voltage and operative with said core member for magnetizing said core member to positive saturation, and a third control winding operative with said core member for providing an induced voltage across said third control winding, an impedance member connected to said voltage source for providing a voltage drop across said impedance member, and an electrical switching member responsive to said voltage drop as opposed by said induced voltage for controlling the operation of said apparatus after the time period required for the positive saturation of said core member by said second control winding.

5. In electrical control apparatus for controlling the fuel supply to an engine, said apparatus being operative with a predetermined voltage source, the combination of a magnetically saturable core member, a first winding connected to said voltage source and operative with said core member for magnetizing said core member to saturation, a second winding operative with said core member for providing an induced voltage across said second winding during said magnetization of said core member to saturation, a variable impedance member connected to said voltage source for providing a voltage drop across said impedance member as a function of the value of said impedance member, means responsive to an operating condition of said engine, said responsive means operable, in response to said condition to vary the variable impedance member as a function of said predetermined operating condition of said engine related to power output, and an electrical control member responsive to said voltage drop as opposed by said induced voltage for controlling the operation of said engine as a function of said engine operating condition.

6. The apparatus of claim 5 with the impedance value of said impedance member being varied as a function of predetermined engine opreating temperature.

7. The apparatus of claim 5 with the impedance value of said variable impedance member being varied as a function of a predetermined engine operating pressure.

8. In electrical control apparatus for a movable member, said apparatus being operative with a predetermined voltage source, the combination of a magnetically saturable core member, a first winding connected to said voltage source and operative with said core member for magnetizing said core member to saturation, a second winding operative with said core member for providing an induced voltage across said second winding, a first impedance member connected to said voltage source for providing a voltage drop across said impedance member, a second impedance member connected in series with said first winding and being variable as a function of the ambient temperature adjacent said core member and being operative to correct for the temperature effect on said core member, and an electrical control member responsive to said voltage drop as opposed by said induced voltage for controlling the position of said movable member.

9. An electrical timer device comprising a magnetically saturable core member, a source of direct current voltage and a Zener diode connected across said source to provide a regulated voltage output, a first winding inductively associated with said core and connected to said source for causing said core member to become magnetically saturated during a predetermined time interval, an electrical switching device, a source of electrical voltage connected to said switching device for keeping said switching device in a normally conducting condition, a second winding inductively associated with said core for receiving an induced voltage during the saturation of said core and connected to said switching device in such manner as to effectively oppose said electrical voltage and keep said switching device in non-conducting condition, and an electro-responsive control device connected to said switching device.

10. An electrical timer device comprising a source of regulated direct current voltage, a magnetically saturable core member, a first winding inductively associated with said core and connected to said voltage source for causing said core member to become magnetically saturated in a positive direction during a predetermined time interval, a second winding inductively associated with said core for receiving an induced voltage during said time interval, an electrical switching device, a resistance member connected to said voltage source for providing a control voltage drop effective to keep said switching device in a conducting condition, and means connecting said second winding to said switching device such that said induced voltage opposes said control voltage and said switching device is placed in a non-codnucting condition during said time interval.

11. An electrical timer device comprising a magnetically saturable core member, a source of direct current voltage and means connected to said source for providing a regulated voltage output, a first winding inductively associated with said core and connected to said regulating means for causing said core to become magnetically saturated during a predetermined time interval, an electrical switching device, a resistance member connected to said voltage source for providing a control voltage drop effective to keep said switching device in a conducting condition, a second winding inductively associated with said core and connected in series with said resistance member and said switching device such that said control voltage drop is prevented from causing said switching device to conduct current until said core has become magnetically saturated.

References Cited in the file of this patent

UNITED STATES PATENTS

| | | |
|---|---|---|
| 2,610,466 | Ballantyne et al. | Sept. 16, 1952 |
| 2,623,354 | Best | Dec. 30, 1952 |
| 2,695,993 | Haynes | Nov. 30, 1954 |
| 2,708,342 | Allen et al. | May 17, 1955 |
| 2,760,088 | Pittman et al. | Aug. 21, 1956 |
| 2,772,370 | Bruce et al. | Nov. 27, 1956 |
| 2,809,303 | Collins | Oct. 8, 1957 |
| 2,823,321 | Sims | Feb. 11, 1958 |

FOREIGN PATENTS

| | | |
|---|---|---|
| 614,341 | Great Britain | Dec. 14, 1948 |